United States Patent
Bowman et al.

(10) Patent No.: US 8,336,046 B2
(45) Date of Patent: Dec. 18, 2012

(54) DYNAMIC VM CLONING ON REQUEST FROM APPLICATION BASED ON MAPPING OF VIRTUAL HARDWARE CONFIGURATION TO THE IDENTIFIED PHYSICAL HARDWARE RESOURCES

(75) Inventors: Mic Bowman, Beaverton, OR (US); Rob Knauerhase, Portland, OR (US); Paul Brett, Hillsboro, OR (US); Robert Adams, Lake Oswego, OR (US)

(73) Assignee: Intel Corporation, Santa Clara, CA (US)

( * ) Notice: Subject to any disclaimer, the term of this patent is extended or adjusted under 35 U.S.C. 154(b) by 1347 days.

(21) Appl. No.: 11/648,251

(22) Filed: Dec. 29, 2006

(65) Prior Publication Data

US 2008/0163210 A1 Jul. 3, 2008

(51) Int. Cl.
*G06F 9/455* (2006.01)
(52) U.S. Cl. .............................. 718/1; 718/104; 718/105
(58) Field of Classification Search .............. 718/1, 104, 718/105
See application file for complete search history.

(56) References Cited

U.S. PATENT DOCUMENTS

| | | | |
|---|---|---|---|
| 6,970,902 B1* | 11/2005 | Moon ............................. | 709/201 |
| 7,761,573 B2* | 7/2010 | Travostino et al. ........... | 709/226 |
| 2004/0010787 A1* | 1/2004 | Traut et al. ......................... | 718/1 |
| 2004/0128670 A1* | 7/2004 | Robinson et al. ................. | 718/1 |
| 2004/0221290 A1* | 11/2004 | Casey et al. .................... | 718/104 |
| 2004/0268347 A1* | 12/2004 | Knauerhase et al. ............. | 718/1 |
| 2005/0060704 A1* | 3/2005 | Bulson et al. ...................... | 718/1 |
| 2005/0132362 A1* | 6/2005 | Knauerhase et al. ............. | 718/1 |
| 2005/0132363 A1* | 6/2005 | Tewari et al. ...................... | 718/1 |
| 2005/0138623 A1* | 6/2005 | Fresko ........................... | 718/102 |
| 2005/0160424 A1* | 7/2005 | Broussard et al. ................. | 718/1 |
| 2005/0198303 A1* | 9/2005 | Knauerhase et al. ......... | 709/227 |
| 2005/0268298 A1* | 12/2005 | Hunt et al. ......................... | 718/1 |
| 2006/0101189 A1* | 5/2006 | Chandrasekaran et al. ...... | 711/6 |

(Continued)

FOREIGN PATENT DOCUMENTS

GB 2378535 2/2003

(Continued)

OTHER PUBLICATIONS

Krsul et al., VMPlants: Providing and Managing Virtual Machine Execution Environments for Grid Computing, 2004, IEEE, pp. 1-12.*

(Continued)

*Primary Examiner* — Meng An
*Assistant Examiner* — Abu Z Ghaffari
(74) *Attorney, Agent, or Firm* — Blakely, Sokoloff, Taylor & Zafman LLP

(57) ABSTRACT

Methods and apparatuses enable creation of a virtual machine (VM) clone initiated through application or service logic. The application requests generation of a VM clone from within the runtime execution of the application. The request is serviced by a VM generator, which identifies a state of the VM to clone and identifies hardware resources on which to create the VM clone. Based on a determination of what resources on which to generate the VM clone, the VM generator creates the VM clone on the determined resources, having the identified state. In one embodiment, a use case of resource copy or reference copy is selected for each resource. In one embodiment, the VM generator considers a number of factors in determining where to instantiate the VM clone. The parameters may include hints or preference parameters sent by the application and/or resource loading or performance.

13 Claims, 4 Drawing Sheets

U.S. PATENT DOCUMENTS

| | | | |
|---|---|---|---|
| 2006/0143617 A1* | 6/2006 | Knauerhase et al. | 718/104 |
| 2006/0184935 A1* | 8/2006 | Abels et al. | 718/1 |
| 2006/0195715 A1* | 8/2006 | Herington | 714/4 |
| 2006/0294524 A1* | 12/2006 | Vega | 718/104 |
| 2007/0074208 A1* | 3/2007 | Ling et al. | 718/1 |
| 2007/0214456 A1* | 9/2007 | Casey et al. | 718/100 |
| 2007/0234302 A1* | 10/2007 | Suzuki et al. | 717/126 |
| 2007/0271560 A1* | 11/2007 | Wahlert et al. | 718/1 |

FOREIGN PATENT DOCUMENTS

| | | | |
|---|---|---|---|
| GB | 2378535 A | * | 2/2003 |
| WO | WO-02101504 | | 12/2002 |
| WO | WO-2005109195 | | 11/2005 |
| WO | WO 2005109195 A2 | * | 11/2005 |

OTHER PUBLICATIONS

Zhao et al., Distributed File System Support for Virtual machines in Grid Computing, 2004, IEEE, pp. 202-211.*

Grit et al., Virtual Machine Hosting for Networked Clusters: Building the Foundation for Autonomic Orchestration, 2006, IEEE, pp. 1-8.*

Ruth et al., Autonomic Live Adaptation of Virtual Computational Environments in a Multi-Domain Infrastructure, 2006, IEEE, pp. 1-10.*

*Office Action for Korean Patent Application* No. 10-2007-139593 dated Apr. 28, 2009; 5 pages.

"VMware VirtualCenter Version 1.4 User's Manual", http://www.vmware.com/pdf/vx_users14.pdf, (Jul. 6, 2006).

Extended European Search Report mailed Aug. 24, 2009 for European Application No. 07255030.4-1243/1939742.

Office Action for EP07255030.4 mailed Mar. 17, 2011, 6 pages.

Office Action from Japanese Application No, 2007-334343 mailed Mar. 22, 2011,9 pages.

Office Action from Japanese Application No. 2007-334343 mailed Jan. 10, 2012, 3 pages.

* cited by examiner

DYNAMIC VM CLONING ON REQUEST FROM APPLICATION BASED ON MAPPING OF VIRTUAL HARDWARE CONFIGURATION TO THE IDENTIFIED PHYSICAL HARDWARE RESOURCES

FIELD

Embodiments of the invention relate to virtual machine technology, and more particularly to dynamic creation of virtual machines.

BACKGROUND

The use of virtualization is increasing as virtual machines are employed to enable mulitiple separate operating environments to execute on available hardware. Traditionally, virtual machine creation occurs through administrative actions, usually involving a human administrator configuring and enabling each virtual machine. In some cases, one or more operations are scriptable, which allow a script to be executed on behalf of an administrator that could configure and enable a virtual machine (e.g., a service that can be invoked). The user input required for traditional virtual machine creation has reduced the opportunities for the use of virtualization in a work environment; especially in the use of virtual machines for specialized purposes (e.g., testing, executing an isolated process), where the effort involved in setting up the virtual machine may not seem justified for the expected use of the virtual machine. This may particularly be true where the lifespan of the virtual machine is intended to be relatively short (e.g., on the order of seconds). The lack of opportunities to use virtualization may result in higher security risks and development costs involved with not being able to execute particular processes or perform particular tasks in an isolated environment, such as that offered by virtualization.

BRIEF DESCRIPTION OF THE DRAWINGS

The following description includes discussion of various figures having illustrations given by way of example of implementations of embodiments of the invention. The drawings should be understood by way of example, and not by way of limitation.

DETAILED DESCRIPTION

Figure 1:
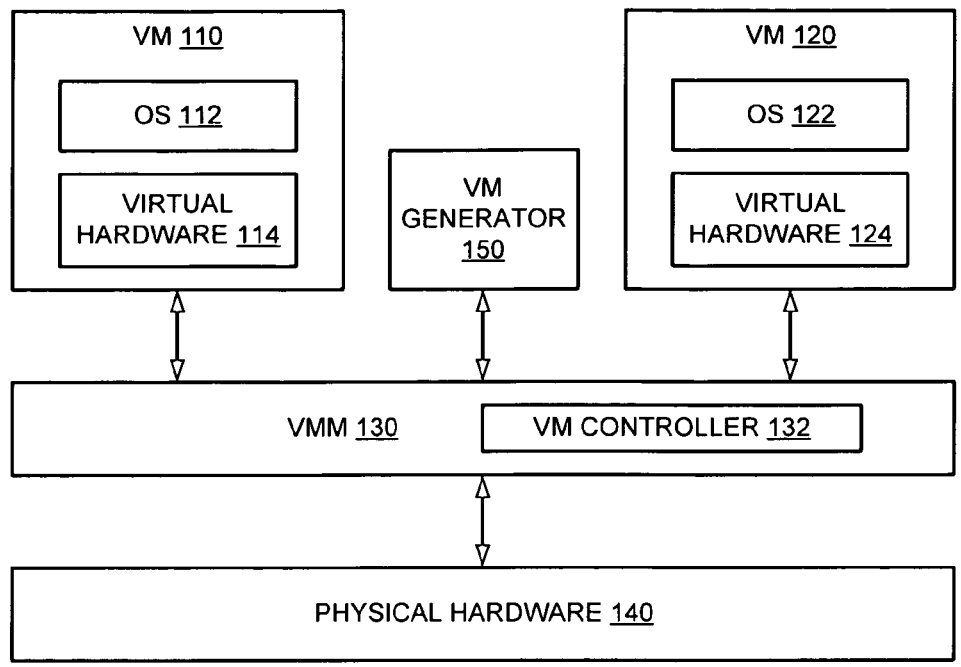
FIG. 1 is a block diagram of an embodiment of system having a virtual machine (VM) generator that dynamically creates VMs.

As used herein, references to one or more "embodiments" are to be understood as describing a particular feature, structure, or characteristic included in at least one implementation of the invention. Phrases such as "in one embodiment" or "in an alternate embodiment" appearing herein describe various embodiments and implementations of the invention, and do not necessarily all refer to the same embodiment. However, they are also not necessarily mutually exclusive. Descriptions of certain details and implementations follow, with an overview description of embodiments of the invention, followed by a more detailed description with reference to the drawings.

A system includes a virtual machine (VM) generator to dynamically create VMs during runtime. In contrast to traditional VM creation, which requires administrative activity, an application or service can incorporate virtual machine creation into its basic application logic. As used herein, "application" will be used herein to describe the invocation of VM generation, which is only for the sake of simplicity in description; indeed, an application or service or other software entity can include logic that can invoke VM generation as described herein. Thus, where "application" is mentioned as providing a request or providing parameters for VM creation, it should be understood to apply equally well to services or other software entities. An application can request the generation of a VM (e.g., via a "vmfork" programming language construct) from the VM generator. The VM generator receives the operation request and clones a running VM.

The VM generator as described herein can make use of a "vmfork" operation that clones running virtual machine. The VM generator can be considered to have two main portions: a VM cloning mechanism, and a new VM location mechanism. In one embodiment, invocation of a VM cloning operation by an application initiates both mechanisms in the VM generator. Thus, an application can request the generation of a VM clone, and the VM generator determines what resources need to be allocated to generate the clone, determines where to generate the clone, and creates the clone in the determined location.

In one embodiment, invoking the vmfork operation results in the performance of logical actions including creating the virtual resources, copying the state or software environment of the cloned VM, and returning an identifier for the new VM to the requesting application. Creating the virtual resources may include providing any of a number of system configurations. As explained more fully below, resources may be duplicated, shared, or initially shared and duplicated as configuration changes are introduced. Note that different resource use cases can exist within a VM clone, which means that different use cases can exist among different resources within a single VM. Thus, for example, one resource may be duplicated in the VM clone (e.g., a storage resource), while another resource is shared in the clone (e.g., a network interface). The selection of resource configurations for the VM clone will depend upon any number of factors, including the purpose for the clone, the expected life expectancy of the clone, the available resources with which to clone, etc.

Copying the state of the cloned VM may include duplicating an operating system and software environment in which the VM to be cloned is executing. Copying the state may include setting configurations, etc. Copying the state of VM may include duplicating or sharing disk contents, processes, memory contents, peripheral state, etc.

Returning an identifier for the new VM to the requesting application can include returning a handle, IP (Internet Protocol) address, or other identifier for a successfully cloned VM. In the case where the cloning was unsuccessful, an error may be returned to the requesting application.

In addition to operations/actions that may support a cloning mechanism, the VM generator may perform any of a number of operations/actions to support determining a location for the cloned VM. The location for cloning the VM can be determined by numerous factors, examples of which may include properties of the cloned (new) VM (e.g., those inherited from the original VM, those specified by a process that invoked the cloning, etc.), properties of the current computing environment (e.g., load on the machine, power requirements, etc.), and/or other factors. Factors to be considered by the VM generator may include resource allocation and/or availability (e.g., memory, disk/storage (including network attached storage, NAS), availability of processor/cores, available I/O (input/output), access to networks, connections to other computers, resource latency, latency to a device, latency to a network location, reliability, etc.), hints and/or preferences from the requesting application (prefers new VM on single hardware device, VM will exist for x number of seconds/minutes, required availability, etc.), or any other consideration.

Some current operating systems include a standard "fork" operation (operating systems that support the Portable Operating System Interface for uniX (POSIX)), which clones a running process in a separate address space. The usefulness of such an operation is illustrated by the frequency with which related process creation operations (or "fork" operations) are executed by software applications and services in environments where such an operation is supported. Similarly, providing a "vmfork" operation will enable applications and/or services to generate related VMs. Furthermore, the invocation of VM creation as described herein through the application logic abstracts away the determination (in part or completely) of where to bring up a new VM. The abstracting away of such a determination relieves the programmer of the burden of writing code to dynamically, at runtime, determine where and how to distribute code. Instead, such a determination can be handled by the VM generator.

In one embodiment, the invocation of VM creation (e.g., the "vmfork") is performed as a function call to a VM generator subroutine that handles the VM creation. Alternatively, the VM creation could be invoked via other mechanisms, for example, sending a message or a signal to a VM generator, invoking an interrupt that initiates the VM generator, or other means.

FIG. 1 is a block diagram of an embodiment of system having a virtual machine (VM) generator that dynamically creates VMs. System 100 includes VM 110, which is a VM to be cloned. For the sake of clarity and not by way of limitation, VM 110 will be referred to as "original VM 110," which refers to the fact that VM 110 exists and is running when cloning operations as described herein are initiated. VM 120 of system 100 represents a clone of original VM 110, and for the sake of simplicity and not limitation will be referred to as "new VM 120," which refers to the fact that new VM 120 is derived from original VM 110.

Original VM 110 includes operating system (OS) 112, which represents not only an operating system specifically, but a software environment or a software state of original VM 110. Original VM 110 also includes virtual hardware 114, which represents a hardware state of original VM 110. Virtual hardware 114 refers to all hardware resources allocated to original VM 110. Virtual hardware 114 is mapped to physical hardware 140, which represents actual devices within system 100, such as memory, processor(s), network interface(s), storage, disk drive(s), etc. Note that physical hardware 140 may exist within one or more distinct physical device or machines of system 100. That is, physical hardware 140 may all exist within a single box, or may exist as a virtual aggregation of resources of multiple separate boxes. Physical hardware 140 can include physical devices available as network resources (e.g., network-attached storage (NAS), rack-mounted resources, etc.), and/or resources available from multiple networked devices.

VMM 130 represents a virtual machine manager or hypervisor, which manages the physical resources of physical hardware 140, and the allocation or mapping of virtual hardware 114 to the physical resources. In one embodiment, VMM 130 is coupled to VM generator 150, which includes a VM cloning mechanism and a new VM location mechanism. As used herein, coupling refers to any type of connectivity, whether electrical, mechanical, and/or communicative. Coupling of one hardware component to another may occur through other hardware. Software components can be coupled to each other through function calls, or other invocations of a routine/subroutine. Hardware and software can be coupled through drivers or other software that enables a software module to provide control commands to a hardware component. In one embodiment, VM generator 150 is part of VMM 130, or VM generator 150 provides an extension of VMM 130. Note that VM generator 150 can stand alone from VMM 130. VMM 130 may reside on a multi-platform environment (e.g., a multi-core machine) that executes VMs, or may be a network entity that manages a platform executing VMs.

VMM 130 includes VM controller 132, which represents one or more components to manage VMs. VM controller 132 enables VMM 130 to manage resources of the VMs, and perform diagnosis and recovery of interrupted VMs. In one embodiment, VM generator creates a VM clone via VM controller 132.

VM generator 150 receives a request from an application to clone original VM 110. To clone original VM 110, VM generator 150 determines what resources are necessary to clone the VM. VM generator 150 determines from VMM 130 what physical resources are used (e.g., identifies virtual hardware 114), and determines the operating environment of original VM 110 (e.g., what is the state of OS 112). VM generator 150 can identify a state of original VM 110, for example, through requesting configuration information and reading such information.

VM generator 150 determines from physical hardware 140 and the identified physical resources and operating state of original VM 110 where a clone can be generated. New VM 120 includes virtual hardware 124 that has a mapping to hardware resources equivalent to those of original VM 110. Likewise, OS 122 is equivalent to the state of OS 112. In one embodiment, after generating new VM 120, VM generator 150 returns to the requesting application an identifier for new VM 120.

Figure 2:
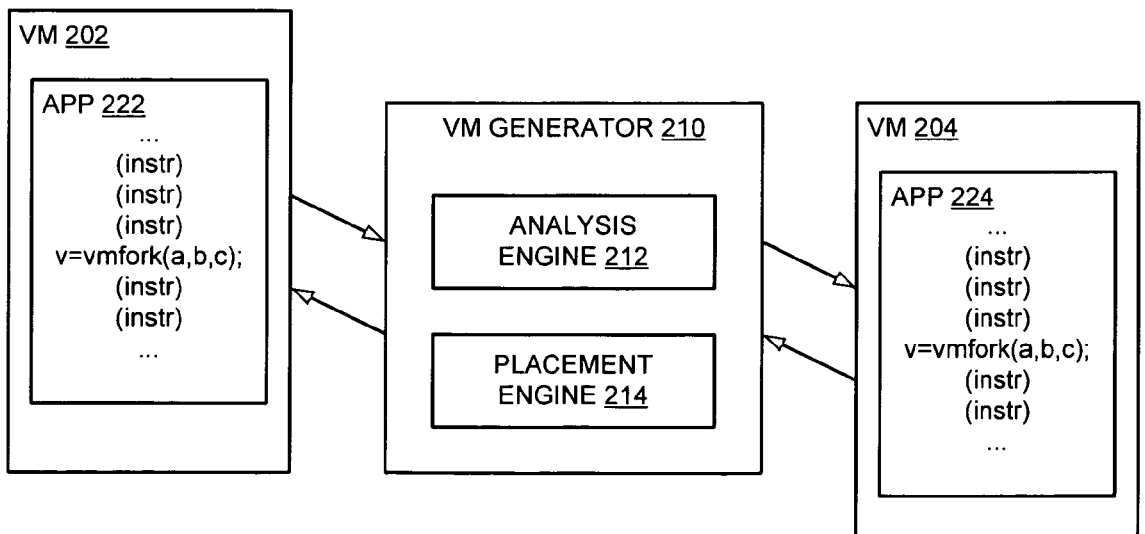
FIG. 2 is a block diagram of an embodiment of system having a virtual machine (VM) generator with an analysis engine and a placement engine.

FIG. 2 is a block diagram of an embodiment of system having a virtual machine (VM) generator with an analysis engine and a placement engine. System 200 includes VM 202, which includes application (app) 222. Application 222 includes various lines of instructions (instr) that represent the flow of operation of the application. At one point in the flow of operation of the application, application 222 includes an instruction v=vmfork(a,b,c), which represents a request to generate a clone of VM 202, with certain parameters 'a,' 'b,' and 'c.' The parameters may indicate preferences or hints regarding the creation of VM 204, which is the clone of VM 202. For example, invoking application 222 may indicate a preference for VM 204 to be generated within the same physical device as VM 202, or a preference for VM 204 to be generated with all resources on a single hardware device. Application 222 could also indicate hints as to the purpose of the clone, the expected lifespan of the clone, etc. In one embodiment, the parameters allow application 222 to pass information regarding its software environment to VM generator 210.

VM generator 210 receives the vmfork instruction with any parameters passed, and determines what resources are needed to clone VM 202, and where clone VM 204 will be generated. In one embodiment, VM generator 210 includes analysis engine 212, which enables VM generator 210 to identify the various hardware resources needed and the software states of VM 202 that will be cloned. In one embodiment, VM generator 210 includes placement engine 214, which enables VM generator 210 to identify physical resources to map to the virtual hardware on which the software states will be cloned in VM 204. VM 204 is illustrated with application 224, which represents a clone of application 222. After the vmfork instruction is processed and executed (which generates VM 204), execution of the application continues where it left off, with the instruction after the vmfork instruction. Note that execution of the application will continue in VM 202, as well as in VM 204. Thus, application 222 can be programmed with one or more sections that require a virtual machine, create the virtual machine, and the code needing the virtual machine will be executed in a separate environment.

Figure 3:
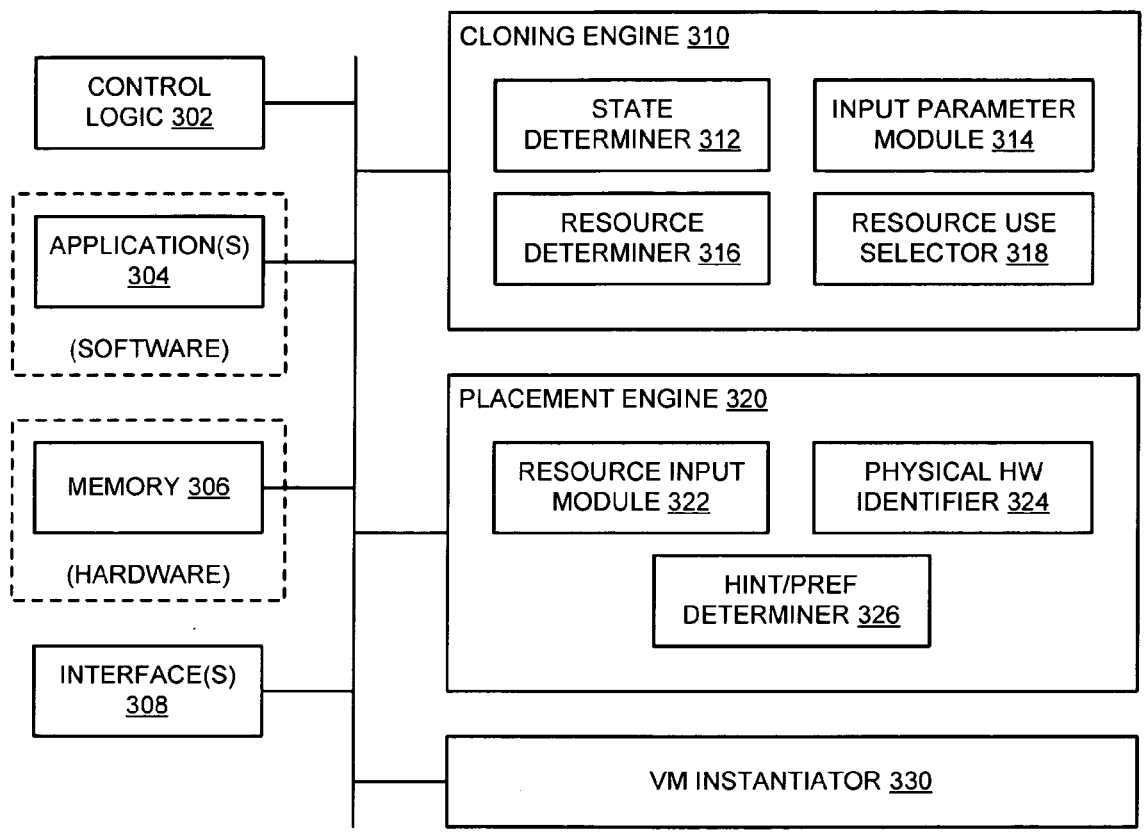
FIG. 3 is a block diagram of an embodiment of a virtual machine (VM) generator.

FIG. 3 is a block diagram of an embodiment of a virtual machine (VM) generator. VM generator 300 includes control logic 302, which implements logical functional control to direct operation of VM generator 300, and/or hardware associated with directing operation of VM generator 300. Each of the components represented in VM generator 300 is a means that may be implemented with hardware, software, or a combination. Logic 302 may be hardware logic circuits and/or software routines. In one embodiment, the logic may be instructions executing on a processor of a computing device. Thus, in a software implementation, logic 302 provides instructions for the control of operation of a processor that executes VM generator 300. In a hardware implementation, logic 302 represents circuitry that provides functional control (e.g., outputs on a signal line). Logic 302 may also refer to the operating instructions and circuitry that control, for example, an embedded processor in an implementation with software and hardware combined.

In one embodiment, in an implementation that is partially or wholly software, VM generator 300 includes one or more applications 304, which represent code sequences and/or programs that provide instructions to control logic 302. Applications 304 may be code executing on a common processor that executes VM generator 300.

In one embodiment, VM generator 300 includes memory 306 and/or access to memory resource 306 for storing data and/or instructions. In a hardware implementation, a hardware circuit that represents VM generator 300 may include a memory device. In a software implementation, memory 306 can be understood to refer to the ability of a software module to store data in memory and access registers for the execution of code. Thus, memory 306 may include memory local to VM generator 300, as well as, or alternatively, including memory of a device on which VM generator 300 resides.

VM generator 300 also includes one or more interfaces 308, which represent access interfaces to/from (an input/output interface) VM generator 300 with regard to entities external to VM generator 300. In one embodiment, VM generator 300 is accessible as a component of a system that can be manipulated externally by a user through a user interface. Thus, interfaces 308 may include graphical user interfaces, keyboards, pointer devices, etc., in an implementation where VM generator 300 is accessible to human users. In an alternative embodiment, VM generator 300 executes "behind the scenes" to a human user, meaning the module performs its functions without being visible to the human user. However, even if not visible to a human user as a separate component, VM generator 300 can be accessible to external electronic components, or external software applications. Thus, in one embodiment, interfaces 308 include mechanisms through which external programs may access the module (e.g., drivers in a hardware implementation of VM generator 300, application program interfaces (APIs) in a software implementation, etc.).

VM generator 300 also includes cloning engine 310, which represents one or more functional components that enable VM generator 300 to provide resource allocation for VM cloning. VM generator 300 also includes placement engine 320, which represents one or more functional components that enable VM generator 300 to provide placement of a cloned VM. Cloning engine 310 and placement engine 320 may be implemented as hardware and/or software, and provides the functionality of VM generator 300. The functions or features of the components include, or are provided by, one or more means, which may include state determiner 312, input parameter module 314, resource determiner 316, and resource use selector 318 for cloning engine 310, and resource input module 322, physical hardware (hw) identifier 324, and hint/preference (pref) determiner 326 for placement engine 320. Each component may further include other modules to provide specific functionality. As used herein, a module refers to routine, a subsystem, etc., whether implemented in hardware, software, or some combination.

State determiner 312 enables cloning engine 310 to determine an operating state of a VM to clone. The operating state can include an operating system executing on the VM, applications executing on the operating system, and system configurations. Included within the operating state may be security information, permissions, passwords, etc. Note that an equivalent operating state in a cloned VM does not necessarily infer an exactly identical configuration. For example, in a case where separate physical resources are used, IP addresses or other network identifiers may be different, digital certificates may be different, etc. Thus, "equivalent" should not be understood herein as meaning exactly the same, but a state that is substantially the same, with the exception of certain variables. In one embodiment, state determiner 312 accesses configuration tables and/or files to determine the state of the VM to clone.

Input parameter module 314 enables cloning engine 310 to receive hints and/or preference parameters from the requesting application. In one embodiment, state information is also passed as a parameter. Input parameters may also include system and network information. Input parameter module 314 parses and processes the various input parameters. The input parameters provide cloning engine 310 with information that may be used in determining what resources are available for cloning a selected/identified VM.

Resource determiner 316 enables cloning engine 310 to identify resources that are in the virtual hardware configuration/profile of the VM to be cloned. Resource determiner 316 also determines what resources are available in the device on which the application that requested the clone is executing, as well as network resources available. In one embodiment, resource determiner 316 also determines a load on the resources identified in the device on which the application is executing and/or the network resources. In one embodiment, VM generator 300 is configured to generally create a VM with resources that have the lightest load. In one embodiment, resource determiner 316 compiles a list or a data structure that includes the information on resources needed, resources available, and potentially the state of available resources. Such a data structure can be passed by resource determiner 316 to another function or module, for example, a component of placement engine 320.

Resource use selector 318 enables cloning engine 310 to determine a use case for each resource identified to be cloned. The specifics of use case selection are more fully described with reference to FIG. 4, and will only be briefly discussed here. Resources can be shared, where both the original VM and the new VM map to a single physical component via their virtual hardware configuration. Resources can also be copied, referring to a use case where a physical component mapped by the original VM is duplicated and mapped by the new VM. Duplication of the resource includes copying contents. Resources can also be initially shared, and copied on change (for example, copy-on-write for storage). Thus, for read or access purposes, both VMs may map to the same physical device. However, if a configuration change or a change in contents is generated in the new VM, at least that portion of the physical device is duplicated for the new VM. Thus, a resource can be duplicated in whole or in part.

Resource input module 322 enables placement engine 320 to receive the resource determination of the cloning engine or another entity that might provide a determination of what resources are necessary to generate a VM clone. For example, resource input module 322 may be coupled to resource determiner 316 and receive the output of the resource determiner's determination. Placement engine 320 considers the resource need against what resources are known to be available, and potentially what is the state of those resources. Note that as used herein, "available" generally means that a resource is identifiable and generally accessible to a VM. For available resources, other considerations such as resource loading, permissions, security, etc., may be considered to determine whether an identified resource can be mapped via a VM's virtual hardware.

Physical hardware identifier 324 enables placement engine 320 to identify available physical hardware resources that can be considered for creating a clone VM. In one embodiment, all system resources are indicated to a VMM upon initiation of the VMM, and the information can be made available to VM generator 300. Resources can also be indicated to the VM generator as they become available in a system (e.g., newly added resources can identify themselves to the system). Physical hardware identifier 324 can identify available hardware in general, and specifically enables placement engine 320 to identify specific hardware resources to use for a VM clone. Thus, the specific hardware to be used for a VM clone is determined by physical hardware identifier 324, or an equivalent module. Note that although hardware that will be used for a VM may not reside in a single physical location (e.g., on a single device or in a single rack), the hardware identifies a "location" for the VM or identifies "where" a VM will be created. Thus, when referring to creating a VM in one location or another, the reference to location refers to the hardware resources that will be allocated to the VM, which are mapped in the VM's virtual hardware configuration.

Hint/preference determiner 326 enables placement engine 320 to adjust a determination of where to create the clone VM according to preferences or hints provided by the requesting application. Examples of hints or suggestions are provided above, and will not be repeated here. Such hints or preferences can affect what identifiable hardware resources can actually be allocated for a VM. For example, if a certain load preference is indicated, placement engine 320 may determine that a certain processor is not an appropriate choice for the VM's virtual hardware configuration because the processor has a load above the indicated preference.

VM generator 300 also includes VM instantiator 330. VM instantiator 330, which may also be referred to as a VM instantiation module, represents the ability of VM generator 300 to create the clone VM in the determined location with the identified resources. In one embodiment, creating the clone VM refers to requesting the creation of the VM from the VMM, or triggering the VMM to create the clone VM. Specific algorithms for generating a VM are implementation specific, according to the system in which the VM will be generated and the configuration and capability of the VMM. Thus, discussion of specific algorithms is outside the scope of the discussion herein, and those skilled in the art are considered to be familiar with the instantiation process.

The descriptions herein of modules describe components that may include hardware, software, and/or a combination of these. In a case where a component to perform operations described herein includes software, the software data, instructions, and/or configuration may be provided via an article of manufacture by a machine/electronic device/hardware. An article of manufacture may include a machine readable medium having content to provide instructions, data, etc. The content may result in an electronic device as described herein, performing various operations or executions described. A machine readable medium includes any mechanism that provides (i.e., stores and/or transmits) information/content in a form accessible by a machine (e.g., computing device, electronic device, electronic system/subsystem, etc.). For example, a machine readable medium includes recordable/non-recordable media (e.g., read only memory (ROM), random access memory (RAM), magnetic disk storage media, optical storage media, flash memory devices, etc.). The machine readable medium may further include an electronic device having code loaded on a storage that may be executed when the electronic device is in operation. Thus, delivering an electronic device with such code may be understood as providing the article of manufacture with such content described herein. Furthermore, storing code on a database or other memory location and offering the code for download over a communication medium may be understood as providing the article of manufacture with such content described herein.

Figure 4:
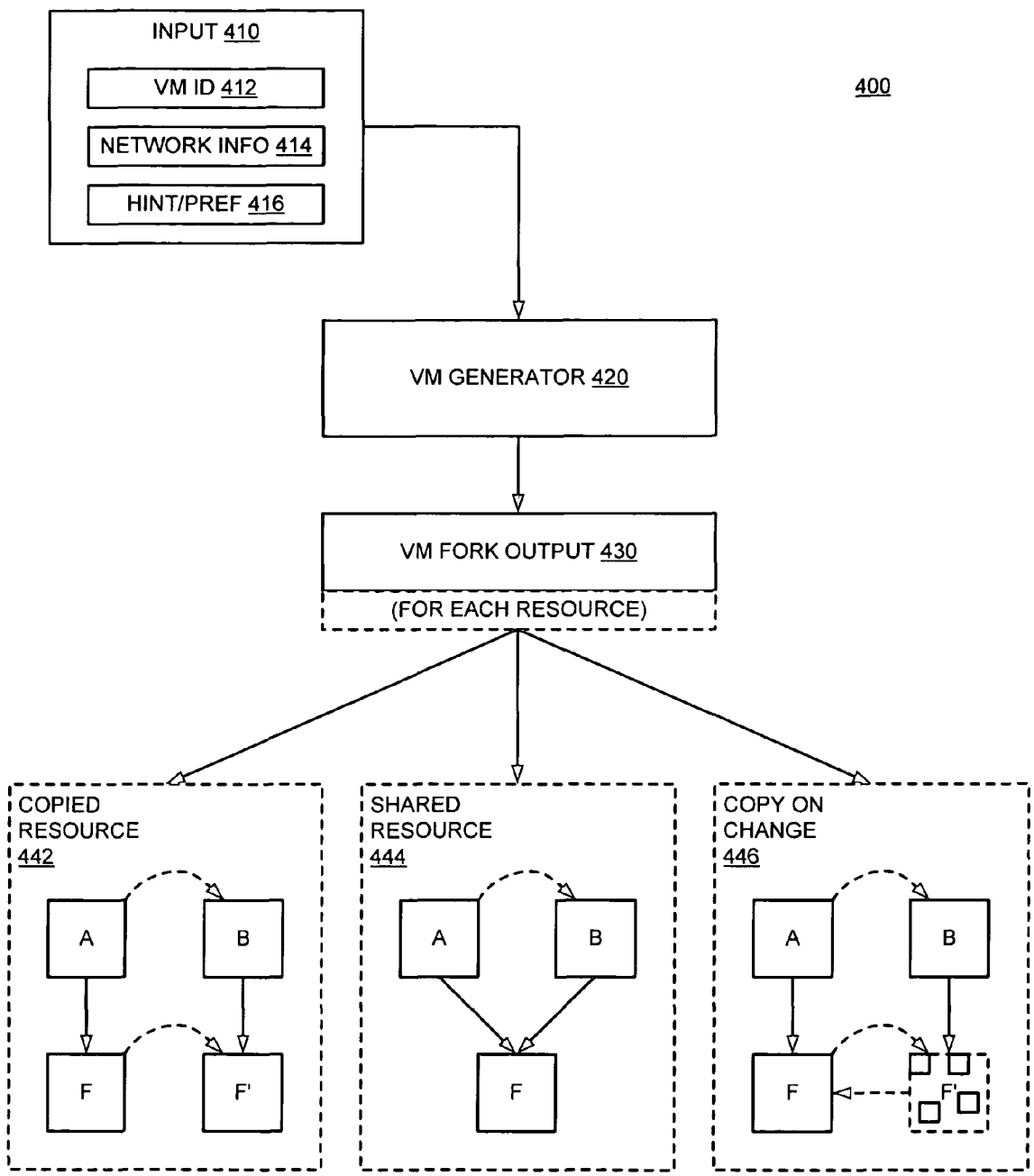
FIG. 4 is a block diagram of an embodiment of system having a virtual machine (VM) generator that dynamically creates VMs with different possible resource use cases.

FIG. 4 is a block diagram of an embodiment of system having a virtual machine (VM) generator that dynamically creates VMs with different possible resource use cases. System 400 represents a system according to any embodiment described herein, with a VM generator according to any embodiment described herein. As illustrated, VM generator 420 receives input 410, which represents any type of request for a VM clone as generated by an application. Thus, input 410 is generated by an application in the course of execution of its code, and the input is provided to VM generator to provide the requested VM creation. In one embodiment, input 410 includes VM identifier (ID) 412, network information (info) 414, and hint/preference (pref) 416. Other items could also be included within input 410.

VM identifier 412 identifies the VM that is to be cloned. Part of the identification can include the configuration of the VM, including hardware and software states. Network information 414 indicates whether network resources are available and, if so, may indicate what resources are available or where to obtain an indication of what is available. Hint/preference 416 refers to hints or preferences indicated in the application's request to clone a VM.

Input 410 is received by VM generator 420, which determines what resources are necessary for cloning the VM, and identifies resources to be used to clone the VM. After the determinations are made, VM generator 420 generates an output, or makes a decision that will be used to actually clone the identified VM. The "output" can simply be the process of generating a mapping of physical resources to a virtual hardware configuration for the new VM, as well as referring to the generation of a report or datastructure or listing, which may occur prior to or after creating the clone. VM fork output 430 represents the output or decision/determination made by VM generator 420. A determination of what resources to use and how the VM will be cloned may be made for the VM as a whole, or in one embodiment, is made individually for each resource. Thus, in one embodiment, the same use case is applied to all resources (e.g., all resources are duplicated). Alternatively, different use cases can be applied to different resources (e.g., the network interface is shared, the storage is copy-on-write, and the memory is duplicated).

One possible output includes copied resource 442 (also referred to herein as a duplicated resource). If the original VM "A", or the VM to be cloned, includes resource F, the clone, VM "B," includes a duplicate of F, which is illustrated as F'. Each VM then has its own resource to use and manage. The configuration and state of the resource can be different for each VM.

Another possible output includes shared resource 444. If the original VM "A" includes resource F in its virtual hardware mapping, the clone, VM "B," also points to F in its virtual hardware mapping. The "copy" of F may simply be a reference to F that is mapped in the virtual hardware of VM B. Thus, both VMs access the same resource, and there is consistency between the configuration, content, and state of the resource as accessible to both VMs. A change to resource F by VM A would be visible to VM B, and VM B would need to access F in the changed state.

Another possible output includes copy on change 446. If the original VM "A" includes resource F in its virtual hardware mapping, the clone, VM "B," initially points to F, and both VM A and VM B would be accessing the identical resource. If a configuration change is made by VM B, or VM A, F' is generated, with the changes being written as a new (copied) resource. Thus, F' is actually F (shared) where F and F' are the same, and is shown as "pointing" to F in FIG. 4; however, for changes, F and F' will be different, and B will point to the changes as its resource, F'.

Figure 5:
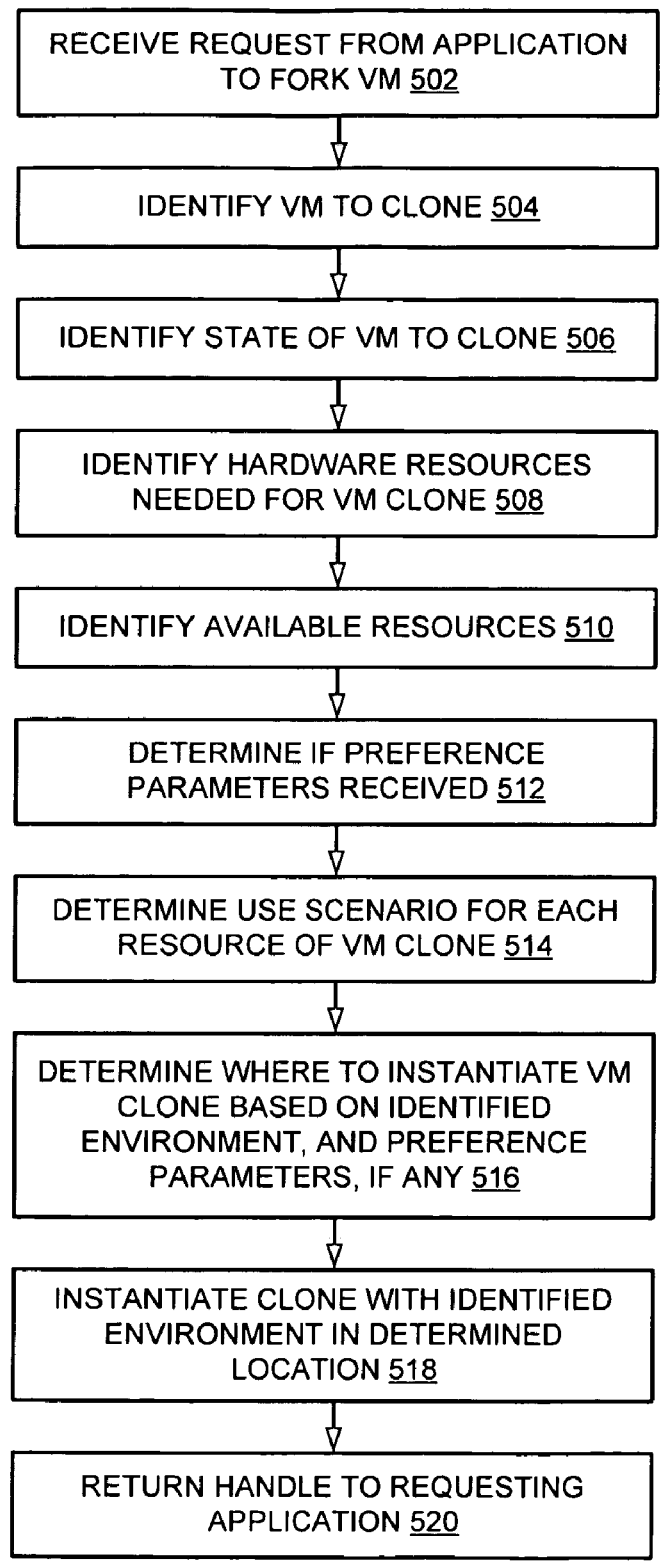
FIG. 5 is a flow diagram of an embodiment of a process for forking a virtual machine (VM) with a VM generator.

FIG. 5 is a flow diagram of an embodiment of a process for forking a virtual machine (VM) with a VM generator. The flow diagram as illustrated herein provides an example of sequences of various operations. Although shown in a particular sequence or order, unless otherwise specified, the order of the operations can be modified. Thus, the illustrated implementation should be understood only as an example, and operations can be performed in a different order, and some operations may be performed in parallel. Additionally, one or more operations can be omitted in various embodiments of the invention; thus, not all operations are required in every implementation. Other flows of operation are possible.

A VM generator receives a request from an application to fork a VM, 502. The request is generated from within the application logic. The VM generator identifies the VM to clone, 504. The VM to be cloned can be identified from an input parameter received from the application that generated the request. The VM generator identifies a state of the VM to clone, 506, which may include reading configuration files, or simply copying the volatile memory from the VM to be cloned. The VM generator also identifies the hardware resources necessary for the VM clone, 508. The hardware resources may be identified from reading a hardware system configuration, or other similar file or setting store. The available hardware resources are also identified by the VM generator, 510. Resources available in a system can be programmed into a VMM and made available to the VM generator, a network or system administration entity can be queried for identification of available hardware resources, or another technique may be used.

The VM generator determines if preference parameters are specified for the VM cloning procedure, 512. The application that requests the clone specifies preferences, if any. If preferences have been indicated, the VM generator factors the preferences into the determination of where to clone the VM. The VM generator can also determine a use case scenario for each resource of the VM clone, 514. As discussed previously, the use case for resources may be the same for all resources to be cloned, or a different use case can be applied for each different resource, or some may be treated together and others treated separately. Note that not all possible types of resources are necessary for every cloning implementation. A VM may have access to only certain resources necessary for specific tasks, and the VM clone will have only those resources. The necessary resources can be an important consideration in determining the use scenario for the cloning of hardware resources.

The VM generator determines where to instantiate the VM clone based on identified environment, and any preference parameters that may be received, 516. The information regarding what resources are necessary and what resources are available, and potentially preferences that weight what resource should be first considered are factored together in a determination decision by the VM generator. Such a determination decision can be referred to as a determination algorithm. Note that the number of types of algorithms and the form of each is a matter of implementation, and the possibilities are potentially endless.

With a determination decision on resources and where to instantiate the VM, the VM generator instantiates the clone with the identified environment in the determined location, 518. After creating the VM clone, the VM generator returns a handle to the requesting application indicating the success of the cloning, 520. In the case that a cloning operation fails, such could be indicated to the requesting application and error processing performed.

Besides what is described herein, various modifications may be made to the disclosed embodiments and implementations of the invention without departing from their scope. Therefore, the illustrations and examples herein should be construed in an illustrative, and not a restrictive sense. The scope of the invention should be measured solely by reference to the claims that follow.

What is claimed is:

1. A method for generating a virtual machine, comprising:
   detecting a runtime request to generate a virtual machine (VM) clone of a VM, the request received from a program executing within the VM to clone that issues a command to duplicate VM to clone, the request received by a virtual machine manager during runtime of the program on a computing device executing the VM to clone;
   identifying an operating state of the VM to clone in response to detecting the cloning request;
   generating a virtual hardware configuration to clone the identified operating state of the VM to clone;
   generating at runtime with the virtual machine manager, in response to the cloning request, a mapping of the virtual hardware configuration to physical hardware resources for the VM clone on the computing device including identifying available hardware resources in the computing device and determining a workload of each of the available physical hardware resources, the physical hardware resources including processing resources and memory resources; and
   generating the VM clone on the physical hardware resources based on the mapping.

2. The method of claim 1, wherein generating the mapping of the virtual hardware configuration to the physical hardware resources further comprises:
mapping by selecting a resource use case for cloning each of the physical hardware resources needed for the virtual hardware configuration for the VM done.

3. The method of claim 2, wherein selecting the resource use case comprises:
selecting a duplicated resource use case, where a copy of the virtual hardware configuration of the VM to clone is made, including the operating state of the physical hardware resource of the VM to clone, and the virtual hardware configuration of the VM to clone and the copy of the VM clone are managed separately.

4. The method of claim 2, wherein selecting the resource use case comprises:
selecting a shared resource use case, where a reference to the hardware resource of the VM to clone is created, and the virtual hardware configurations of the VM clone and the VM to clone reference the same physical hardware resource.

5. The method of claim 2, wherein selecting the resource use case comprises:
selecting a copy on change use case, where a reference to the hardware resource of the VM to clone is created, and the VM clone and the VM to clone both initially access the same physical hardware resource as their respective hardware resources, and further where separate copies of the hardware resource are made for the VM clone and the VM to clone for any change to the operating state made respectively by the VM clone and the VM to clone.

6. The method of claim 1, wherein generating the mapping of the virtual hardware configuration to the physical hardware resources further comprises:
identifying one or more input/output (I/O) and/or network access hardware resources to use for cloning.

7. The method of claim 1, wherein generating the mapping of the virtual hardware configuration to the physical hardware resources further comprises:
identifying a resource;
determining one or more of a capacity of the resource, a latency to access the resource, or a reliability of the resource; and
selecting physical hardware resources based on the one or more of the capacity of the resource, the latency to access the resource, or the reliability of the resource.

8. An article of manufacture comprising a non-transitory machine-readable storage medium having content stored thereon to provide instructions, which when executed cause a virtual machine manager to perform operations including:
receiving a cloning request from an application executing on a virtual machine (VM), the request to clone the VM including the application, the request received from the application during execution of the application on a computing device by the application issuing a command to duplicate the VM to clone;
determining, in response to the cloning request, an operating state of the VM to clone;
generating a virtual hardware configuration to clone the determined operating state of the VM to clone;
generating at runtime with the virtual machine manager, in response to the cloning request, a mapping of the virtual hardware configuration to available physical hardware resources for the clone on the computing device including identifying available hardware resources in the computing device and determining a workload of each of the available physical hardware resources, the physical hardware resources including processing resources and memory resources.

9. The article of manufacture of claim 8, wherein the content to provide instructions for receiving the cloning request comprises content to provide instructions for:
receiving a function call for a function that generates the clone.

10. The article of manufacture of claim 8, wherein the content to provide instructions for receiving the cloning request comprises content to provide instructions for:
receiving an indication of an expected lifespan of the request clone.

11. The article of manufacture of claim 8, wherein the content to provide instructions for receiving the cloning request comprises content to provide instructions for:
receiving an indication to restrict identifying the available resources to resources that all reside on a single hardware device.

12. A computing device including a virtual machine manager with a virtual machine (VM) generator extension, the VM generator comprising:
processing hardware to execute the VM manager and VM generator, the processing hardware to receive an instruction to generate a VM clone from a VM to clone, the instruction received from a program executing within the VM to clone during runtime of the program, the instruction requesting the VM manager to duplicate the VM to clone;
a cloning engine of the VM generator to identify an operating state of the VM to clone in response to the received instruction, generate a virtual hardware configuration to clone the identified operating state of the VM to clone, and generate a mapping of the virtual hardware configuration to physical hardware resources for the VM clone on the computing device including identify available hardware resources in the computing device and determine a workload of each of the available physical hardware resources, the physical hardware resources including processing resources and memory resources;
a placement engine of the VM generator coupled to the cloning engine to determine what available physical hardware resources to use for the mapping of the virtual hardware configuration for the VM clone; and
a VM instantiation module of the VM manager to instantiate the VM clone with the operating state on the physical hardware resources determined by the placement engine.

13. The computing device of claim 12, wherein the placement engine determines what available physical hardware resource to use for the mapping of the virtual hardware configuration for the VM clone comprises the placement engine to:
determine to use hardware resources having the lightest workload.

* * * * *